Patented Jan. 19, 1937

2,067,908

UNITED STATES PATENT OFFICE 2,067,908

PROCESS AND PRODUCT FOR MANUFACTURING LEAVENED BREAD

Albert K. Epstein and Benjamin R. Harris, Chicago, Ill., assignors to Standard Brands, Incorporated, New York, N. Y., a corporation of Delaware No Drawing. Application October 20, 1930, Serial No. 490,089

24 Claims. (Cl. 99—91)

Our invention relates to a new process of manufacturing an improved leavened bread, the process also accomplishing certain advantages in economy of yeast and/or in time required for fermentation. Our invention also includes a new product utilized in practicing the process.

Generally speaking, this invention is an improvement over the prior invention of Albert K. Epstein, which is described in United States Letters Patent No. 1,657,379, relating to a process of fermenting dough by furnishing the yeast an easily available nitrogenous substance, such as urea or urea compounds, thus increasing the yeast proliferation in the dough batch. In the manufacture of leavened bread, it is customary to use flour, water, yeast, salt, and sugar materials, such as cane sugar or dextrose, or any other easily available carbohydrate material adapted to be acted upon by the yeast or yeast enzymes to "raise" the bread. Other baking accessories may be used, such as milk, dextrines, malt extract, and mineral salts. Epstein's prior invention resulted in obtaining a better fermentation producing a well piled loaf, due to the addition to the dough batch of a certain amount of easily assimilable water-soluble nitrogenous substance which served as a yeast food for the yeast during the leavening period.

In the present invention it is our purpose still further to improve the yeast activity to obtain a better leavening than has been obtained heretofore.

Another object is to obtain the same leavening effect with less yeast.

Another object is to decrease the leavening period.

Another object is to furnish the bakers with a new composition of matter, which by direct addition to the ordinary dough batch will greatly improve the same.

Another object is to provide a new process for producing improved leavened bread which may be practiced by the ordinary skilled artisan without other technical assistance than the furnishing of proper materials.

Another object is to furnish the requisite materials in easily usable form, and in a way to permit storage thereof for a reasonable period of time.

Other objects and features of the invention will be apparent from the following description.

Generally speaking, our present improvement consists in adding to the dough batch containing the nitrogenous substances, an enzyme which will act upon such nitrogenous substance so the yeast will obtain nitrogen in a more available form, thus resulting in an improved yeast metabolism and a concomitant proliferation of yeast cells; this changes the entire course of fermentation and produces a loaf of a better volume and also of better grain, texture, and color. More specifically, we use the usual ingredients necessary to make leavened bread, including a sufficient amount of yeast to carry on the fermentation in a given length of time, and preferably an easily assimilatable carbohydrate material. To such dough batch we add a certain amount of a carbamid, and an enzyme preparation capable of liberating ammonia from the carbamid. We allow this batch to ferment, with results hereinafter described.

If this dough batch is allowed to ferment the regular period of time, a baked loaf will be produced which will have a substantially larger volume and better grain, and better texture, than if the dough batch were allowed to ferment for the same time without the addition of the substances of our invention. On the other hand, if we do not desire to increase the volume of our bread beyond a certain range, we may obtain a substantial saving in yeast, and at the same time obtain a bread which has substantially at least as good volume, texture, and grain as a normal loaf, using the customary amount of yeast, but without the improvements of our invention.

Another way in which we can carry out our invention is to save time during the leavening period. In this event we do not decrease the amount of yeast, but use the usual amount of yeast which is necessary to give a well baked loaf of bread. However, by addition of our urease preparation and carbamid with or without other constituents as will be set forth, we can obtain the same character bread in a shorter period of time.

The urease preparation or the enzyme which we employ seems to have an effect on the urea to liberate the ammonia, and this preferably should take place gradually during the fermentation period. We have found that an innocuous metal salt such as sodium chloride, checks the too rapid liberation of ammonia, and controls the action of the constituents, so that the ammonia is liberated by the urease gradually and more progressively, and during a greater time interval. The result is that the yeast has at all times, readily available assimilable nitrogen in the form of ammonia which is necessary for a satisfactory proliferation in the dough batch, and to carry on metabolism to produce the most advantageous results. Consequently, by controlling the action, we can obtain a gradual development of ammonia during a longer period of fermentation without materially changing the reaction of the dough batch, than if we were to use a source of ammonia such as a salt, like ammonium chloride or ammonium sulphate, which would leave an acid residue.

We also find that by using the urease preparation together with urea in combination with other salts, such as innocuous alkaline earth salts, e. g. calcium sulphate, magnesium sulphate, and also in combination with an oxidizing salt in relatively small proportions, such as an innocuous oxidizing salt of a halogen, e. g. potassium chlorate, or potassium bromate, we obtain a different result than if these salts are left out.

It seems that oxidizing salts together with our urease and carbamid material, have an effect upon each other to govern the state and the process of fermentation during the leavening period, and that for these reasons the results differ materially, and the action is improved. Although not wishing to bind ourselves, it appears to us that the oxidizing salt activates the enzyme to render the same more than normally active. Similarly, calcium sulphate may act directly as a yeast nutrient and dough improver, but it appears to act differently in our combination than when used without the urease.

As a source of urease we can use many plants and seeds, but we must be careful not to use a plant which besides urease has other substances or enzymes which will destroy or alter objectionably the course of fermentation. We have found for example, that a water extract of jackbean meal or alcoholic extract of this meal in addition to urease, contains other substances of another nature but apparently enzymic in character, which have a detrimental effect upon the fermentation, and unless such noxious substances are eliminated, jackbean meal or similar sources of urease can not be used in our invention satisfactorily. We can therefore, use a relatively concentrated extract of soy-bean meal which has not been heated at a temperature too high to destroy the urease enzymes. If an organic solvent is used to extract the oil from the soy-bean at low or moderate temperatures, the meal will be a better product as a source of our enzymes than if pressure and heat have been used to extract the oil.

We can also use finely ground soy-beans directly, preferably by eliminating part of the bran and the germ. However, we can use the bean together with this germ without any detrimental effect in the bread dough, the finely ground soy-bean serving as a source of urease which is available in the dough without being preliminarily extracted. For many purposes, this is the most satisfactory practical means for introducing the urease into the bread dough.

We can also use as a source of urease, the culture medium of certain fungi which will produce a certain amount of urease. These organisms and fungi produce urease in the form of an endogenous enzyme. For this reason, we can make suitable alcoholic extracts which can then be dried by evaporating the alcohol to produce a dry preparation, which can be used as a source of urease. The amount of carbamid that we can use varies, but the quantity should be sufficient to produce increased fermentation and increased yeast metabolism and proliferation during the leavening period, with the object of giving a good commercial loaf. In order to carry out our invention we can proceed as follows:

Add to the dough batch containing 100 pounds of flour, one-half ounce of carbamid and one-half pound of ground soy-beans from which the bran has been partially removed, and an amount of yeast sufficient to ferment the resulting dough batch in a given length of time. The dough should contain sufficient available carbohydrates for the yeast to carry on its life processes during the fermentation period, or it must contain sufficient enzymes to make carbohydrate material available for the yeast if there is a deficiency of readily available carbohydrate material. Thus, by using a suitable amount of carbamid together with urease we can save yeast and still obtain fermentation of a better nature which results in a baked loaf of better volume, better grain, and texture.

The invention can also be carried out by adding to the dough batch containing 100 pounds of flour, the usual amount of yeast, one-half ounce of carbamid, one-half pound of soy-bean flour, sufficient available carbohydrate or enzyme substances capable of producing available carbohydrate from the flour material, and ferment the dough batch in a shorter period of time. In this case the urease will make the nitrogen available for the yeast in the form of ammonia without leaving an inorganic residue of a strongly acid material resulting from the assimilation of nitrogenous substances. This ammonia will be liberated progressively during the fermentation and yeast metabolism will be promoted. Thus a good bread with good volume, texture and grain can be produced in a relatively shorter period of time.

We can use in the above dough batch, in addition to the substances enumerated, a considerable quantity of mineral salts, such as calcium sulphate and magnesium sulphate and a relatively small amount of an oxidizing compound. Thus for example, good results may be obtained by adding to each 100 pounds of flour used in the dough batch, sufficient available carbohydrates for the yeast to carry on its life processes, one-half ounce carbamid, one and one-half ounces of calcium sulphate, and 0.016 ounce of potassium chlorate or 0.008 ounce potassium bromate, and one-half pound of soy-bean flour, containing an adequate quantity of urease.

It must not be assumed that the oxidizing compound indicated is the only one available for our purpose. For example, in place of potassium chlorate, we can use other oxidizing agents such as ammonium persulphate, potassium persulphate, sodium or potassium bromate, or combinations of various oxidizing agents as catalysts in combination with carbamid and a urease preparation such as soy-bean.

However, the amount of oxidizing agents used must be in very small proportions. If too large a quantity is used, over-stimulation appears to be obtained, and the results are unfavorable. Thus, for example, in combination with soy-bean and carbamid, we may use an amount of chlorate equal to .001% or an amount of bromate equal to .005% based upon the flour in the dough batch.

Our invention contemplates furnishing to bakers and baking establishments, a dry preparation which can be added directly to the ordinary dough batch so as to obtain the best results from our process herein described.

We have discovered that we can stabilize the composition of matter which we propose to use for our dough improvement, so as to retain the potency of the ingredients when they are added to the dough batch, even though they may have been stored for a relatively long time before use. It appears that if soy-bean meal or ground soy-bean flour or a similar urease-containing substance is admixed with carbamid even in substantially dry form and allowed to stand for some time, there is a tendency for the urease to act upon the carbamid, thus liberating ammonia, lowering the carbamid content, and impairing the value of the product.

We have discovered that if we add to this substantially dry mixture, a substantial amount of sodium chloride, we diminish or reduce the activity of the urease on the carbamid in the subsantialy dry mixture. A very good preparation which will keep for a long time, and which will give very good results when used in the dough batch, is prepared according to the following formula.

| | Ounces |
|---|---|
| Soy-bean flour containing urease | 8 |
| Carbamid | ½ |
| Calcium sulphate | 1½ |
| Potassium chlorate | .016 |
| Sodium chloride | 4 |
| Sufficient starchy material such as flour to make 1 pound. | |

This composition of matter in the quantity given may be added to 100 pounds of flour with yeast, together with the other ingredients used in making a dough batch.

When carbamid and urease in the above composition of matter are in contact with sodium chloride, the latter reduces the tendency of the carbamid to change into ammonia. However, when this composition of matter is diluted with the ingredients of the dough batch, the salt becomes sufficiently diluted to allow the progressive evolution of ammonia from the carbamid by the urease during the fermentation period.

In preparing the dough batch, it may at times be advisable to eliminate from the formula a proportionate amount of salt, since it is present in this composition of matter. This depends, however, upon the amount of salt that the baker is using in his formula.

As to the manner of introducing our bread improving substances, where the straight dough system is used, the urease and carbamid are incorporated into the dough with all of the other ingredients when the dough is prepared and the entire batch is fermented in the usual manner, formed into loaves, proofed and baked. In the sponge process the carbamid and urease are mixed with the sponge batter, which should also be supplied with a sufficient amount of carbohydrate material to enable the yeast to carry on the fermentation. A relatively small amount of sugar, such as .5% to 1%, based upon the amount of flour is satisfactory for the purpose. The sponge batter is allowed to ferment until it reaches the proper height in the trough, at which time the remaining flour and other materials are added to form the completed dough in the usual manner. The dough is then formed into loaves, proofed and baked.

In supplying the readily available carbohydrate material to the dough, whether in the straight dough, or sponge process, we may use, for example, sucrose dextrose, maltose, or diastase, or an active malt extract. The proportions may, of course, be varied. Since the usual straight dough process makes use of a certain amount of sugar, the carbamid and urease may merely be added to the dough having a usual straight dough formula.

What we claim as new and desire to protect by Letters Patent of the United States is:—

1. A process for producing leavened bread which comprises supplying to a dough batch containing yeast, a readily available carbohydrate material, carbamid, urease, and an innocuous oxidizing agent for activating the urease in said dough batch.

2. A process for producing leavened bread which comprises supplying to a dough batch containing yeast, a readily available carbohydrate material, carbamid, urease, and an innocuous oxidizing salt of a halogen for activating the urease in said dough batch.

3. A process for producing leavened bread which comprises supplying to a dough batch containing yeast, a readily available carbohydrate material, carbamid, urease, an innocuous salt of an alkaline earth metal, and an innocuous oxidizing salt of a halogen for activating the urease in said dough batch.

4. A bread improving preparation comprising carbamid, urease, and sodium chloride.

5. A bread improving preparation comprising a readily available carbohydrate material, carbamid, urease, and an innocuous oxidizing agent for increasing the activity of the urease in a dough batch.

6. A bread improving preparation comprising carbamid, urease, an oxidizing agent for increasing the activity of the urease, and sufficient sodium chloride to inactivate the urease during storing and before being dispersed in bread dough.

7. A bread improving preparation comprising a readily available carbohydrate material, carbamid, urease, and innocuous salt of an alkaline earth metal.

8. A bread improving preparation comprising a readily available carbohydrate material, carbamid, urease, and an innocuous oxidizing salt of a halogen to activate the urease in a dough batch.

9. A bread improving preparation comprising a readily available carbohydrate material, carbamid, urease, calcium sulphate, and potassium chlorate.

10. A bread improving preparation including soy-bean flour containing urease, carbamid, a relatively small amount of an oxidizing agent, and sodium chloride for diminishing the action of the urease on the carbamid before introduction into the bread dough.

11. A bread improving preparation comprising a readily available carbohydrate material, carbamid, soy-bean flour containing urease, calcium sulphate, and potassium chlorate.

12. A bread improving preparation comprising a readily available carbohydrate material, carbamid, urease, calcium sulphate and an innocuous bromate salt.

13. A process for producing leavened bread which comprises supplying to a dough batch containing yeast, a readily available carbohydrate material, carbamid, and soy-bean flour containing urease and an innocuous oxidizing agent to activate enzymes present in said soy-bean flour.

14. A bread improving preparation comprising a readily available carbohydrate material, carbamid, urease and potassium bromate for activating the urease in a dough batch.

15. A bread improving preparation comprising a readily available carbohydrate material, carbamid, urease and ammonium persulphate for activating the urease in a dough batch.

16. A bread improving preparation comprising a readily available carbohydrate material, carbamid, soy-bean flour containing urease, calcium sulphate and potassium bromate.

17. A bread improving preparation comprising a readily available carbohydrate material, carbamid, soy-bean flour containing urease, calcium sulphate and ammonium persulphate.

18. A bread improving preparation comprising a readily available carbohydrate material, carbamid, urease, calcium sulphate, and ammonium persulphate.

19. A bread improving preparation comprising a readily available carbohydrate material, carbamid, urease, calcium sulphate and an innocuous chlorate salt.

20. A bread improving preparation comprising a readily available carbohydrate material, a carbamid capable of releasing ammonia in the presence of urease, urease, calcium sulfate, and an innocuous bromate salt.

21. A bread improving preparation comprising a readily available carbohydrate material, a carbamid capable of releasing ammonia in the presence of urease, soy bean flour containing urease, calcium sulfate, and potassium bromate.

22. A process for producing leavened bread which comprises supplying to a dough batch containing yeast, a readily available carbohydrate material, a carbamid capable of releasing ammonia in the presence of urease, urease, an innocuous salt of an alkaline earth metal, and an innocuous oxidizing salt of a halogen for activating the urease in said dough batch.

23. A process for producing leavened bread, which comprises supplying to a dough batch containing yeast, a readily available carbohydrate material, a carbamid capable of releasing ammonia in the presence of urease, urease, and an innocuous oxidizing agent for activating urease in said dough batch.

24. A bread improving preparation comprising a readily available carbohydrate material, a carbamid capable of releasing ammonia in the presence of urease, urease, and an innocuous oxidizing agent for activating said urease in a dough batch.

ALBERT K. EPSTEIN.
BENJAMIN R. HARRIS.